(No Model.)

R. J. STUART.
SHAFT COUPLING.

No. 369,136. Patented Aug. 30, 1887.

WITNESSES:
C. Neveux
C. Sedgwick

INVENTOR:
R. J. Stuart
BY Munn & Co.
ATTORNEYS.

UNITED STATES PATENT OFFICE.

ROBERT J. STUART, OF NEW HAMBURG, NEW YORK.

SHAFT-COUPLING.

SPECIFICATION forming part of Letters Patent No. 369,136, dated August 30, 1887.

Application filed June 7, 1887. Serial No. 240,526. (No model.)

*To all whom it may concern:*

Be it known that I, ROBERT J. STUART, of New Hamburg, in the county of Dutchess and State of New York, have invented a new and Improved Shaft-Coupling, of which the following is a full, clear, and exact description.

Reference is to be had to the accompanying drawings, forming a part of this specification, in which similar letters of reference indicate corresponding parts in all the figures.

Figure 1:
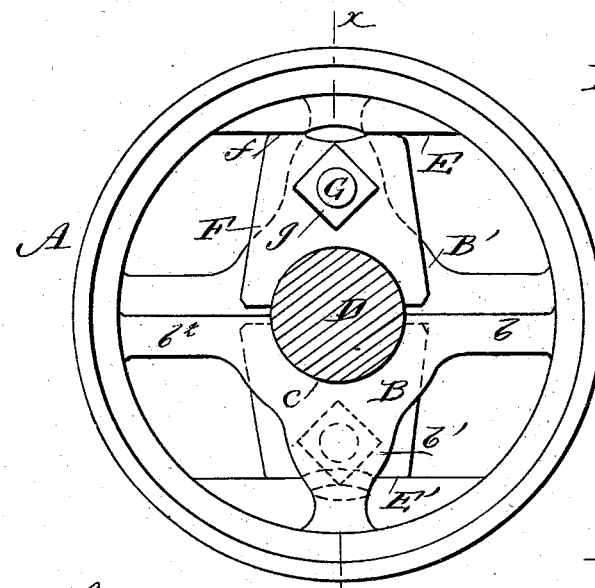
Figure 2:
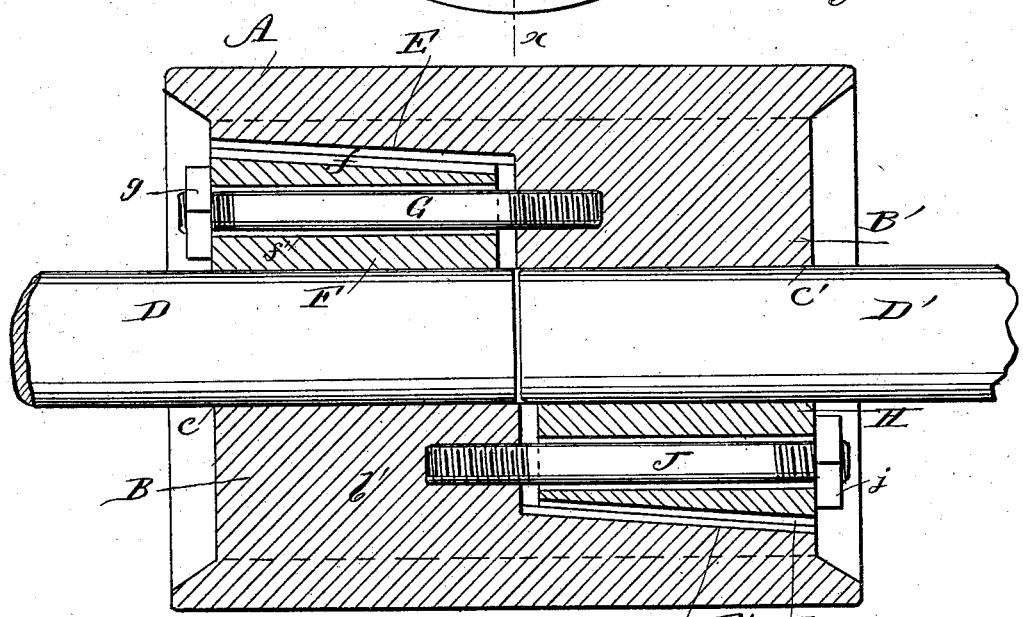
Figure 3:
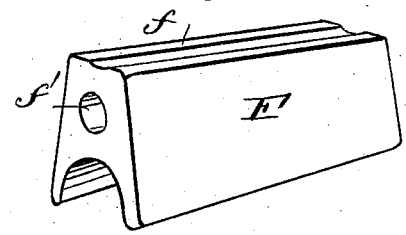

Figure 1 is an end elevation of my new and improved shaft-coupling. Fig. 2 is a sectional elevation of the same, taken on the line $x\,x$ of Fig. 1; and Fig. 3 is a perspective view of one of the wedges for securing the coupling and shaft together.

The invention will first be described in connection with the drawings and then pointed out in the claims.

A represents the body of the coupling, made, preferably, of cast-iron and formed with a circular periphery, so that the coupling may be used as a pulley, if desired. The interior of the body A is formed with two opposite bridges, B B'. The bridge B joins the body A by the three webs $b\,b'\,b^2$, and the bridge B' is united to the body by three similar webs. The bridge B is formed with a concaved seat, $c$, for the shaft D, and the bridge B' is formed with a concaved seat, $c'$, for the shaft D', and these seats are at opposite ends and opposite sides of the body A, so that the coupling is perfectly balanced as to weight. Opposite the bridge B is formed the inclined surface E, against which the outer inclined surface, $f$, of the wedge F acts for binding the shaft and the coupling together. A bolt, G, is fitted in the bridge B', and an aperture, $f'$, is formed through the wedge F to fit upon the bolt, and upon its outer end is placed the nut $g$, which forces the wedge F into place and holds it, so as to securely bind the shaft D.

Opposite the bridge B' is formed the inclined surface E', against which the outer inclined surface, $h$, of the wedge H acts for binding the shaft D' on the seat $c'$ of the bridge B'. A bolt, J, like the bolt G, is screwed into one web, $b'$, of the bridge B, over which bolt the wedge H fits, and which is provided with the nut $j$ for forcing the wedge into the coupling for binding the shaft D'.

Having thus described my invention, what I claim as new, and desire to secure by Letters Patent, is—

1. The shaft-coupling herein shown and described, the same consisting of the body A, having the two bridges B B' at opposite ends and sides of the interior of the body, and formed with the inclines E E', and the wedges F-shaped to fit the shafts at one side and inclined at the opposite side, substantially as described.

2. The body A, having formed upon its interior two bridges arranged at opposite ends and sides, and connected to the body A by webs $b\,b'\,b^2$, substantially as described.

3. The shaft-coupling herein shown and described, the same consisting of the body A, having the two opposite bridges B B', and the inclines E E', the wedges F H, and the bolts G J, substantially as described.

ROBERT J. STUART.

Witnesses:
 H. A. WEST,
 C. SEDGWICK.